Patented June 15, 1948

2,443,368

UNITED STATES PATENT OFFICE 2,443,368

PLASTICIZED UREA-FORMALDEHYDE RESIN

James Ranald Alexander, Donald Burton, and Frederic Hausmann, Bolton, England, assignors to William Walker and Sons Limited, Bolton, England, a British company No Drawing. Application November 27, 1943, Serial No. 512,022. In Great Britain December 14, 1942

4 Claims. (Cl. 260—32.2)

This invention relates to amino-formaldehyde resins and especially to those made from urea, thiourea, melamine and the like.

It is well known that such resins, especially in aqueous solution, dry out to give very hard and brittle products. The brittleness of these resin condensation products is a disadvantage and precludes their use for many applications.

In the case of amino-formaldehyde resins soluble in organic solvents, the problem of plasticisers is not as difficult as in the case of the water-soluble types of resins. In the former case oils, such as castor oil, cellulose nitrate plasticisers such as butyl phthalate, and tricresyl phosphate, as well as many synthetic resins of the alkyd type may be used. These plasticisers are, however, insoluble in water and are unsuitable for resins in aqueous solution.

For aqueous amino-formaldehyde resins, plasticisers such as glycerol, sorbitol, and other polyhydric alcohols have been used. The addition of Borneol and camphor has also been suggested for the production of flexible products.

According to the present invention, we incorporate in a water-soluble amino-formaldehyde resin large amounts of a plasticiser consisting of an alkali salt of a lactate, e. g., the lactates of ammonium, sodium or potassium, commonly known as alkalis, which have excellent plasticising properties for the above resins.

Example

A 50% aqueous solution of a urea-formaldehyde resin is prepared by condensing urea and commercial aqueous formaldehyde in the proportions of 1 mol. of urea to 2¾ molecules of formaldehyde. The condensation is carried out at 100° C. for 1 hour at pH 7.5 and then for 1 hour at pH 4.5.

To 10 parts by weight of the above solution are added 6 parts by weight of a 50% aqueous solution of sodium lactate. The mixture is then dried under reduced pressure for three days at 30° C. The product is glass clear and tough and shows no tendency to crack or craze on further drying.

The resin without the addition of sodium lactate dries out to a brittle solid which cracks and finally disintegrates.

The proportions of lactate to be used depend on the particular application for which the amino resin is required. Thus for an adhesive for laminating leather, 2 parts lactate only are required for 100 parts amino resin, but in order to prevent shrinkage and cracking in an adhesive for wood, it is necessary to use 15 parts lactate for 100 parts resin.

The lactate is thus usually a minor proportion of the whole. The lactate is preferably less than 25% by weight of the resin.

We declare that what we claim is:

1. A tough plastic resin comprising a major proportion of urea-formaldehyde resin and a lesser proportion of sodium lactate.

2. A tough plastic resin comprising urea-formaldehyde resin combined with from 2 to 15 per centum of sodium lactate.

3. A composition of matter having a major proportion of a urea-formaldehyde resin and a minor proportion of an alkali lactate.

4. A composition of matter having a major proportion of a urea-formaldehyde resin and from 2 to 25 per cent by weight of an alkali lactate.

JAMES RANALD ALEXANDER.
DONALD BURTON.
FREDERIC HAUSMANN.

REFERENCES CITED

The following references are of record in the file of this patent:

UNITED STATES PATENTS

| Number | Name | Date |
|---|---|---|
| 2,170,273 | Morgan | Aug. 22, 1939 |
| 2,322,887 | Schwartz | June 29, 1943 |
| 2,331,377 | D'Alelio | Oct. 12, 1943 |
| 2,347,024 | Beer | Apr. 18, 1944 |
| 2,374,687 | Dangelmajer | May 1, 1945 |

OTHER REFERENCES

Wertheim, Textbook of Organic Chemistry, 2d ed., page 301.